Nov. 29, 1955

S. W. BARNES 2,725,481

CALUTRON RECEIVER

Filed July 23, 1946

INVENTOR.
SIDNEY W. BARNES
BY
*Robert A. Cavender*
ATTORNEY.

Fig. 2.

INVENTOR.
SIDNEY W. BARNES

Nov. 29, 1955

S. W. BARNES 2,725,481

CALUTRON RECEIVER

Filed July 23, 1946

INVENTOR.
SIDNEY W. BARNES
BY
ATTORNEY.

Fig.5.

United States Patent Office 2,725,481
Patented Nov. 29, 1955

2,725,481
CALUTRON RECEIVER

Sidney W. Barnes, Rochester, N. Y., assignor to the United States of America as represented by the United States Atomic Energy Commission Application July 23, 1946, Serial No. 685,591

11 Claims. (Cl. 250—41.9)

The general subject of this invention involves the separation, based on difference in mass, of minute particles, such as atoms, and especially the separation of isotopes of an element, or the separation of a portion of an element enriched with respect to a particular isotope on a scale yielding commercially useful quantities of the collected material.

The type of means or mechanism to which the invention relates is known as a "calutron," and correspondingly the method or process is known as a "calutron" method or process. For a complete disclosure of a calutron and its mode of operation, reference is made to the copending application of Ernest O. Lawrence, Serial No. 557,784, filed October 9, 1944, for "Methods of and Apparatus for Separating Materials," now Pat. No. 2,709,222.

As disclosed in the above-mentioned Lawrence application, the presently preferred form of the calutron comprises an evacuated tank disposed between the poles of an electromagnet so that the evacuated space within the tank is pervaded with a magnetic field of high flux density. Within the tank there is provided a "source unit" adapted to project an initially divergent, curving beam of positive ions of a polyisotopic charge material through the magnetic field. The individual ions travel along arcuate paths, and the radii of the ion paths vary with the masses of the ions (within a magnetic field of uniform intensity), whereby the beam continues to diverge for 90° of travel of its constituent ions from the source unit and then converges toward and diverges beyond respective foci for ions of different isotopes, the foci being located approximately 180° along the ions' paths from the source unit. A "receiver" is disposed within the tank adjacent the 180° foci of the ions to be separated for de-ionizing them and separately collecting quantities of material respectively enriched with respect to different isotopes of the charge material.

The paths of a stream of ions of a given mass do not all cross precisely at a line focus at the 180° position, and the cross sectional area of the stream of ions at the 180° region of sharpest focus thereof would normally have an elongated rectangular configuration of substantial width, the width varying with the maximum angular divergence of the ions at the source. The quantity of material transmitted in the beam also varies with the maximum angular divergence at the source, and, with streams of ions of the heavier elements, a practical minimum divergence for collecting commercial quantities of material produces 180° foci (for different isotopes) of such width that they overlap considerably. Thus, in practice, the material collectable at the receiver from the focal region for one isotope is highly contaminated with material of a different isotope having an overlapping focal pattern.

When employing a uniform magnetic field within the calutron tank, the separation of ions of different isotopes leaving the source unit with the same initial angular divergence is dependent solely upon the mass difference of the ions, and they are spaced apart at their respective 180° foci by an amount approximately equal to the difference in the diameters of their respective paths. By reducing the divergence of the beam at the beam defining slit, the widths of the respective 180° foci of streams of ions of different isotopes may be reduced and the amount of overlap of these foci correspondingly reduced. However, since the amount of material transmitted in the beam is proportional to the angular divergence at the source, the amount of overlapping of the 180° foci of streams of ions of different isotopes increases (and the obtainable degree of enrichment of collected material with respect to a particular isotope decreases) as the amount of material transmitted in the beam is increased. As a result, a compromise has been required between maximum production and maximum enrichment.

In order to reduce the amount of overlap of the 180° foci of streams of ions of different isotopes without reducing the intensity of the beam, the shape or configuration of the beam may be modified by introducing predetermined variations in the magnetic field to effect relative shifting of the ion paths. This may be accomplished, for example, by employing so-called "magnetic shims" in a manner disclosed in a copending application of Julius Robert Oppenheimer et al., Serial No. 637,690, filed December 28, 1945. When variations in the magnetic field are produced in the manner disclosed in the Oppenheimer et al. application, the ion paths are so shifted that the normally elongated, rectangular, 180° focal pattern of each isotope ion stream is compressed along one side, is extended along the opposite side, and, in addition, is curved to produce what may be termed a "gull-wing" pattern. This reduces the average width of the focal pattern for each isotope ion stream and increases the length thereof, whereby the lateral overlapping of the foci of different isotopes is substantially reduced, or entirely eliminated, for any given maximum, initial, angular divergence of the beam at the source unit. The above-mentioned Oppenheimer et al. application also discloses how the magnetic field may be controlled for similarly modifying a plurality of ion beams transmitted through the evacuated space within a single tank in non-interfering, intersecting relation.

In my copending application, Serial No. 687,632, filed August 1, 1946, I disclosed a receiver construction and arrangement designed for receiving a plurality of non-interfering, intersecting, ion beams modified in the manner taught by the Oppenheimer et al. application for collecting a single portion of each beam enriched with respect to a single isotope. The particular apparatus disclosed in that application was specifically designed for collecting the $U^{235}$ isotope from a uranium ion beam. The present application relates to an arrangement and construction of calutron receivers designed to receive a plurality of non-interfering, intersecting ion beams for collecting from each beam a plurality of separated quantities of material respectively enriched with respect to different isotopes. The invention will be illustrated herein by a detailed disclosure of apparatus specifically designed for collecting from each of a plurality of uranium ion beams quantities of material respectively enriched with respect to the $U^{235}$ and $U^{238}$ isotopes.

Throughout the following description of the invention, the $U^{234}$ isotope will be ignored, as it comprises too small a proportion of normal uranium to be of any importance as a contaminant of the separated quantities of material enriched with respect to the $U^{235}$ and $U^{238}$ isotopes.

It is a general object of the present invention to provide an improved calutron receiver for collecting from a polyisotopic ion beam separated quantities of material enriched with respect to different isotopes.

More specifically, it is an object of the invention to provide a calutron receiver including a plurality of compartments respectively adapted to receive from a uranium ion beam separated quantities of material enriched with respect to different isotopes, the pockets being so constructed and arranged that the rate of reception of ions by each of the compartments individually may be accurately determined continuously during a collection run.

Another object of the invention is to provide, for the afore-mentioned general purpose, a calutron receiver so constructed that the rate of collection of quantities of material of different isotopes may be continuously measured electrically during a collection run.

Another object of the invention is to provide, for the afore-mentioned general purpose, a calutron receiver that will resist intense ion bombardment during long collection runs without impairment of its efficiency in any material respect.

Another object of the invention is to provide, for the afore-mentioned general purpose, a calutron receiver that is compact in construction and yet is efficient in retaining ions admitted into ion receiving compartments provided therein.

Another object of the invention is to provide a calutron receiver that will effectively retain ions admitted into ion receiving compartments provided therein, irrespective of sputtering and scattering caused when ions strike surfaces of the receiver compartments.

Another object of the invention is to provide a calutron receiver embodying a plurality of pocket surfaces free from direct bombardment and advantageously disposed to permit the deposit of de-ionized beam particles thereon.

Another object of the invention is to provide an improved design for a calutron receiver capable of accomplishing the foregoing objectives when employed to receive a magnetically shimmed, or similarly modified, ion beam.

Still other and more specific objects and advantages of the invention will appear from the following detailed disclosure of one embodiment of the invention, selected for illustrative purposes and shown in the accompanying drawings, in which:

Figure 1:
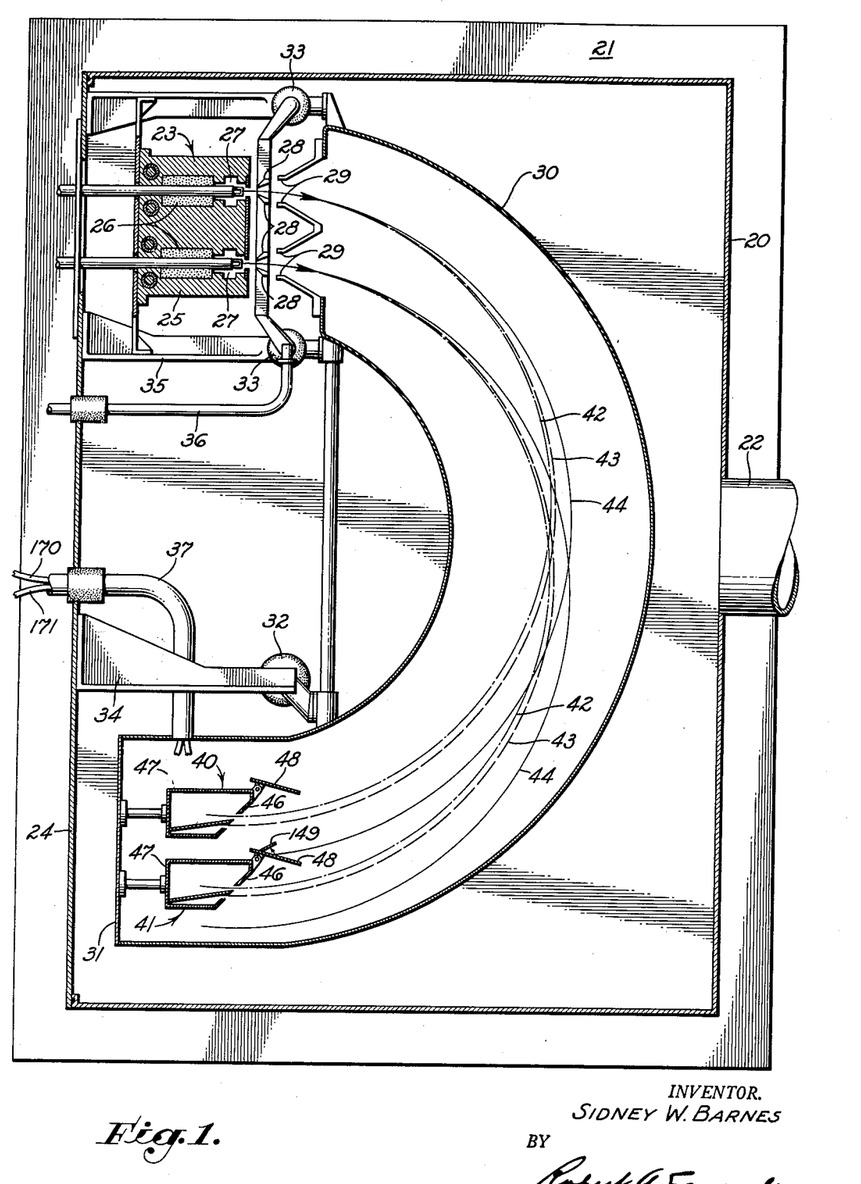
Figure 1 is a vertical sectional view of a calutron tank, showing the arrangement of a plural beam source unit and a corresponding plurality of receivers within the tank, and the relation of the tank to the magnet, the structure being shown, for the most part, somewhat schematically for simplicity.

Referring first to Fig. 1, there is illustrated, somewhat schematically, a calutron of the general character disclosed in the Lawrence application, Serial No. 557,784, mentioned above, but modified in accordance with the general principles disclosed in the second Lawrence application mentioned above, Serial No. 536,401, for transmitting a pair of intersecting, non-interfering ion beams from a source unit to a pair of receiver units, the beams being magnetically shimmed in a manner (not shown) disclosed in the above-mentioned Oppenheimer et al. application and described briefly in the foregoing discussion. The calutron comprises a tank 20 that is rectangular in elevation, as shown in Fig. 1, and is supported midway between a pair of vertically disposed, horizontally spaced-apart, pole faces 21 (only one being shown) of a calutron magnet, whereby a magnetic field may be created throughout the interior of the tank with the magnetic lines of force passing generally horizontally therethrough. The tank is adapted to be evacuated through a pump-out conduit 22 to reduce the interior pressure in a manner disclosed in the above-mentioned Lawrence application, Serial No. 557,784.

A source unit, illustrated schematically in Fig. 1 and generally designated 23, is mounted within the tank 20 adjacent the upper end of a removable wall or face plate 24 thereof. The source unit 23 is adapted to produce, from a polyisotopic charge material such as $UCl_4$, two intersecting, non-interfering beams of singly ionized positive ions traveling along substantially arcuate paths from the source unit toward respective regions of focus approximately 180° along said paths adjacent the lower end of the tank face plate 24. As hereinbefore indicated, the source unit 23 is designed to project the ions of any given mass traveling within a particular beam along paths that are initially divergent to either side of a median path for that beam by various angles between predetermined maxima and that later converge toward and diverge beyond the 180° region of focus for that beam at angles to either side of a median path dependent upon their respective initial angular divergences and upon the effects of the modified magnetic field through which the ions travel. In order to produce two such beams, the source unit 23 is provided with a source block 25 containing two charge material reservoirs 26 in which charge material is vaporized and two ionizing chambers 27 respectively adapted to receive vaporized charge material from the reservoirs 26 and to ionize the vapor by means of an arc discharge. Respective pairs of spaced-apart, ion-accelerating electrodes 28 are disposed in front of the ionizing chambers 27 and are all maintained at a common, highly negative, electrical potential with respect to the source block 25 for withdrawing two separate streams of positive ions therefrom and imparting to the ions substantially uniform kinetic energies in the form of velocities directed between the associated pair of electrodes 28. Respective pairs of spaced-apart, ion-decelerating electrodes 29 are disposed ahead of the pairs of accelerating electrodes 28 and are all maintained at a common negative potential with respect to the source block 25, but at a potential less negative than the potential of the accelerating electrodes 28 for partially decelerating the ions accelerated by the electrodes 28 as they travel toward the gaps between the electrodes 29. For a more detailed description of the purpose and mode of operation of the electrodes 28 and 29, reference is made to the copending application of Byron T. Wright, Serial No. 605,959, filed July 19, 1945.

The ions of the two beams created by the source unit 23, in the manner described above, travel through a liner 30 that surrounds the beams on all sides and has an open end attached to the outermost ones of the two pair of decelerating electrodes 29 and an opposite end closed by a wall 31. The liner 30 is maintained at the same electrical potential as the decelerating electrodes 29, so that ions passing through the liner travel in a substantially uniform electric field, and the liner is suitably supported and insulated from the removable wall 24 of the tank by any suitable arrangement of insulators 32 and 33 and supporting brackets 34 and 35, indicated schematically in Fig. 1. An insulating conduit 36 is provided through which the electrical leads from the accelerating electrodes 28 may be passed to the outside of the tank, and another insulating conduit 37 is provided through which electrical leads from the receiver at the opposite end of the liner 30 may be passed to the outside of the tank. These conduits are constructed with suitable vacuum seals (not shown) for preventing leakage of air therethrough into the tank.

Two ion receivers, generally designated 40 and 41, are disposed within the liner 30 adjacent the end wall 31 thereof for respectively receiving ions traveling in the two beams projected from the source unit 23 through the liner 30. Each of these beams is schematically illustrated in Fig. 1 by two lines 42 and 43 that respectively represent median paths of the singly charged, positive, $U^{235}$ and $U^{238}$ components of a beam produced from $UCl_4$ charge material, and by a third line 44 representing a median path of a side band of $U^{235}$ $Cl^+$ ions. The two receivers may be identical in most respects and are adapted to be positioned with their beam viewing faces 46 disposed in the paths of the U+ portions of the beams to be respectively received thereby. Structure defining the beam viewing face 46 of each receiver (described in more detail hereinafter) is mounted on a suitable receiver frame 47 that is formed, in the present instance, as a casting of nonmagnetic stainless steel; and a swinging type door 48 is mounted on each receiver for movement between an open position out of the paths of the U+ components of the beams and a closed position in the path of the $U^{235}$ component of the beam to be received by the receiver on which the door is mounted.

The two receivers are preferably carried by a suitable support mechanism (not shown) for accurately adjusting the positions of the receivers with respect to the beams to be received thereby. A support mechanism particularly well adapted to perform this function is disclosed and claimed in my copending application, Serial No. 687,632, mentioned above. Except for minor details in the design of the receiver doors 48 and in such brackets or the like as may be employed for mounting the receivers on a selected support mechanism, the two receivers per se may be identical in construction, and only one of them will be described hereinafter.

Referring now to Figs. 2 to 6 inclusive, showing the construction of one receiver in detail, the receiver frame 47 may comprise a cage-like casting 49 having openings in the top, bottom, side, and back walls thereof that are respectively closed by removable cover plates 50, 51, 52, and 53. The forward wall of the casting 49 is formed to provide a suitable surface, inclined at approximately 45° with the vertical and with the general direction of travel of the beam at that point, upon which a suitable delimiting face plate structure may be mounted, and this wall has a large rectangular opening 54 formed therein for admitting into the interior of the receiver all ions passed by the face plate structure.

Figure 2:
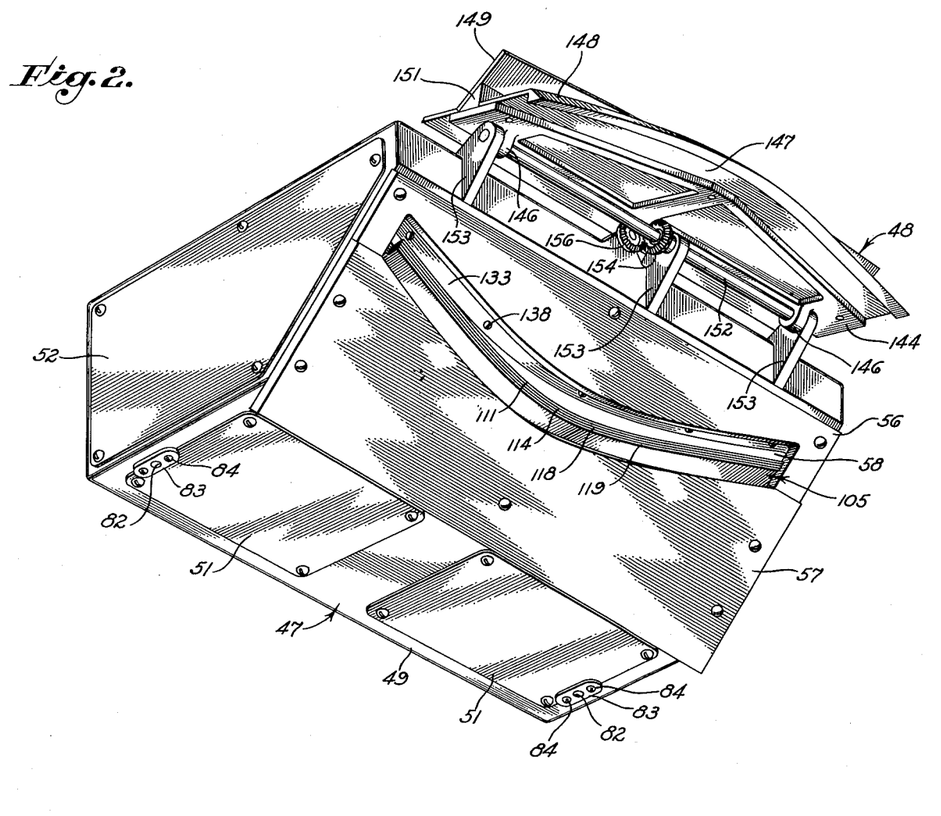
Fig. 2 is an isometric view, on an enlarged scale, of one of the receivers shown schematically in Fig. 1.

The face plate structure is preferably made of graphite and comprises two plates 56 and 57 that are suitably secured directly to the inclined forward surface of the casting 49, whereby the graphite surface exposed to the beam is similarly inclined. As best shown in Fig. 2, the two graphite plates 56 and 57 are disposed in edge-to-edge contact adjacent their ends with their intermediate portions appropriately cut away to form an elongated, curved, beam delimiting slot 58 therebetween. The slot 58 is made to conform as accurately as possible to the size and shape of the combined focal patterns of the $U^{235}$ and $U^{238}$ components of the beam, the configuration of the focal patterns being determined by the characteristics of the magnetic shims or other apparatus employed for modifying the magnetic field through which the beam travels.

Inside the frame 47 and behind the slot 58 in the face plate structure, suitable apparatus is installed for separating into two parts the stream of ions passing through the slot 58 and for retaining the constituent material of the two parts in separated regions within the receiver for separate recovery at the end of a collection run. Such apparatus is mounted within the receiver frame on a platform that is insulated from the receiver frame and comprises a horizontally disposed plate 59 and a vertically disposed plate 61 rigidly secured together along the rearward edge of the horizontal plate 59 in any suitable manner, as by screws 62.

The vertically disposed plate 61 is provided, adjacent its opposite ends respectively, with two integrally formed, upwardly projecting lugs 63, each of which is cut to form a split-collar type of clamp having a centrally formed aperture therethrough for receiving one end of a short insulator rod 64. The split portion of each lug 63 is appropriately shaped, drilled, and tapped to accommodate a screw 66 for tightening the collar securely around the associated insulator rod 64. To provide ample clearance for the insulator rod 64 to project slightly through the lug 63, the body of the plate 61 is counter-sunk along the lower side of the lug 63, as shown at 67. Each insulator rod 64 projects upwardly through an aperture 68 in the casting 49 and through a registering aperture 69 in a plate 71 welded to the casting 49. The upper end of each insulator rod 64 is smaller in diameter than the body of the rod and projects beyond the plate 71 and into a suitable aperture 72 in a cap plate 73 that may be removably secured to the plate 71 by screws 74 for preventing upward movement of the insulator rod 64.

The vertically disposed plate 61 is also provided, adjacent its opposite ends respectively, with two integrally formed, downwardly projecting lugs 76, each of which is cut to form a split-collar type of clamp having a centrally formed aperture therethrough for receiving one end of a short insulator rod 77. The lugs 76 are similar to the lugs 63 and are likewise tightened around the associated insulator rods by cooperating screws 78. To provide ample clearance for the insulator rods 77 to project slightly through the lugs 76, the body of the plate 61 is counter-sunk along the upper side of each of the lugs 76, as shown at 79. Each insulator rod 77 projects downwardly through an aperture 81 in the casting 49. The lower end of each insulator rod 77 is smaller in diameter than the body of the rod and projects into a suitable aperture 82 in a cap plate 83 that may be removably secured to the casting 49 by screws 84 for preventing downward movement of the associated insulator rod 77.

With the structure just described, the platform structure comprising the plates 59 and 61 may readily be mounted in the receiver frame 47 and removed therefrom, and is electrically insulated from the frame 47 when mounted therein. When assembling the receiver, this platform structure is first mounted in the receiver frame in the manner described, and an independently assembled ion separating and trapping structure (next to be described) is then inserted into the receiver frame through the opening 54 in the forward wall thereof and is secured in place on the platform structure. Thereafter, the removable cover plates 50—53 and the face plates 56 and 57 are secured in place to complete the assembly.

The preassembled ion separating and trapping structure mentioned above includes a main frame comprising a horizontally disposed plate 86; a vertically disposed plate 87 rigidly secured along the rearward edge of the horizontal plate 86 by removable fastening elements 88 (only one being shown); and a pair of complementary shaped end plates 89 that are both provided with one or more openings 90 of sufficient length to permit screws 91 to be inserted through respective apertures 92 in the end plates and through respectively registering apertures in the vertical plate 87 and to be screwed into threaded engagement with the vertical plate 61 when the preassembled ion receiving and retaining unit is mounted on the above described platform structure. A sheet metal structure defining an ion receiving pocket 93 is mounted on the vertical plate 87 and comprises forward, top, and back walls preferably formed of a single metal sheet 94; a bottom wall 95 that is longitudinally curved (Fig. 4) to conform to the curvature of the slot 58 and that is flanged in opposite directions along its forward and rearward edges (Fig. 3) and is flanged upwardly along its ends (Fig. 4); and a pair of complementary shaped end walls 96 that are flanged toward each other along their forward, back, and bottom edges and away from each other along their top edges (Figs. 4 and 5). The four sheets comprising the structure defining the pocket 93 may be spot-welded together along their several overlapping edges, and the pocket assembly is removably secured to the top edges of the vertical end plates 89 by a number of screws 97 (Figs. 3 and 4) that pass through the outwardly projecting flanges on the pocket end walls and through lateral extensions of the top wall of the pocket.

A bent plate 98, that is wedge-shaped in transverse section and is longitudinally curved to conform to the curvature of the slot 58, is secured to the vertical plate 87 by a series of screws 99 (only one being shown) that pass through the vertical plate 87 and into the thick edge of the wedge-shaped plate 98. A metal strip 101, of sheet copper or the like, is positioned against the vertical plate 87 between the wedge-shaped plate 98 and the horizontal plate 86 and is held in place by a plurality of screws 102 (only one being shown). This strip 101 is coextensive in length with the wedge-shaped plate 98 and is concavely contoured along one edge to conform to the curvature of the wedge-shaped plate, this strip 101 and wedge-shaped plate 98 being spaced apart sufficiently to accommodate therebetween a thin metal strip 103, of sheet copper or the like. The thin metal strip 103 is also coextensive in length with the wedge-shaped plate 98 and is appropriately bent and fastened to the concave edge of the strip 101 in any suitable manner (not shown) to serve as a baffle or shield for a purpose described hereinafter. A carbon strip 104, similar in size and shape to the metal strip 101, is fitted snugly in the space between the baffle 103 and the horizontal plate 86 and is held in place in a manner also described hereinafter.

The bottom wall 95 of the pocket 93 is disposed in surface-to-surface contact with the concave side of the wedge-shaped plate 98 with the flange on the forward edge of the bottom wall 95 covering the thin forward edge of the wedge-shaped plate. The convex side of the wedge-shaped plate functions as a form against which a plurality of thin carbon sheets or laminae may be pressed for bending them into the desired shape to form a common, laminated, carbon wall 105 for the ion receiving pocket 93 and a second ion receiving pocket 106. This common wall is constrained to conform to the curvature of the slot 58, whereby its forward edge may be disposed within the slot 58 so as to divide it longitudinally into two similar slots respectively leading into the two pockets 93 and 106. The forward wall of the pocket 93 terminates short of the common wall 105 so as to define an opening 107 leading into the pocket 93, the opening 107 being of sufficient width to pass into the pocket 93 substantially all ions passing through the anterior portion of the slot 58 in the face plate structure; and the common wall 105 is inclined at such an angle to the general direction of travel of ions entering the opening 107 so that the first carbon sheet 111 is largely free from direct bombardment by these ions.

Figure 3:
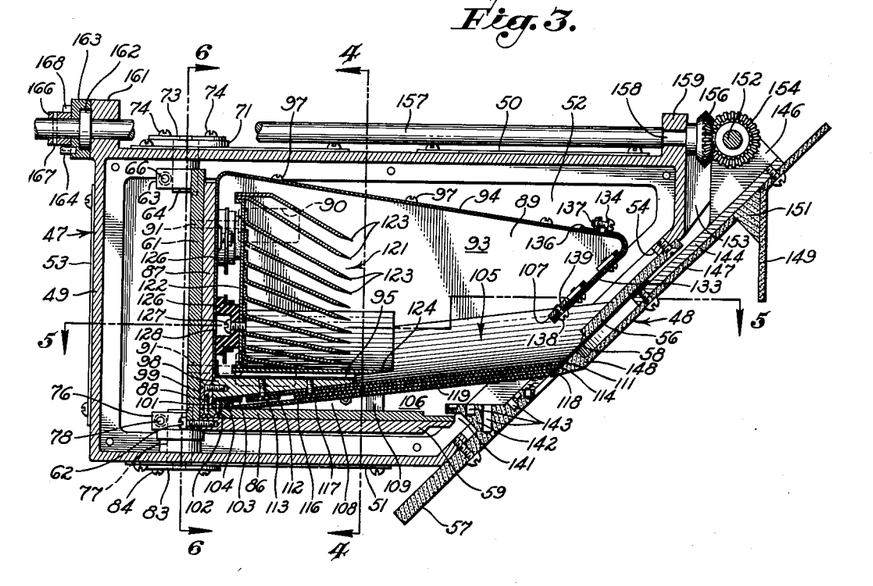
Fig. 3 is a vertical sectional view, on an enlarged scale, of the receiver shown in Fig. 2.
Figure 4:
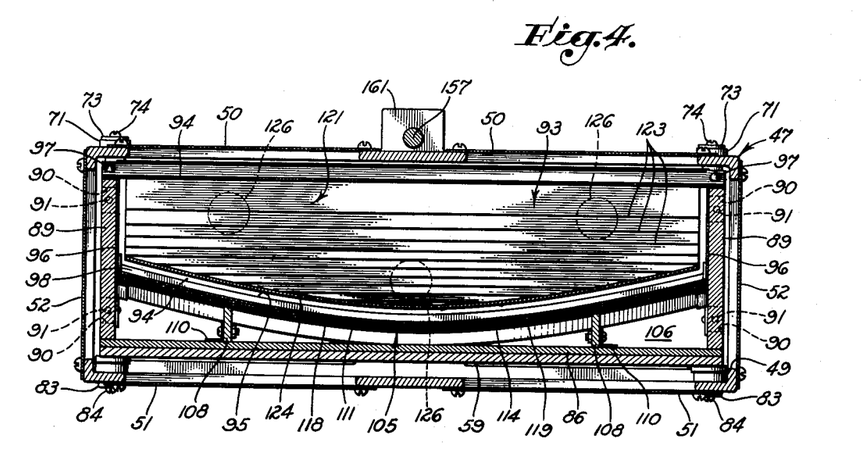
Fig. 4 is a vertical sectional view of the receiver shown in Fig. 2, taken as indicated by the line 4—4 in Fig. 3.
Figure 5:
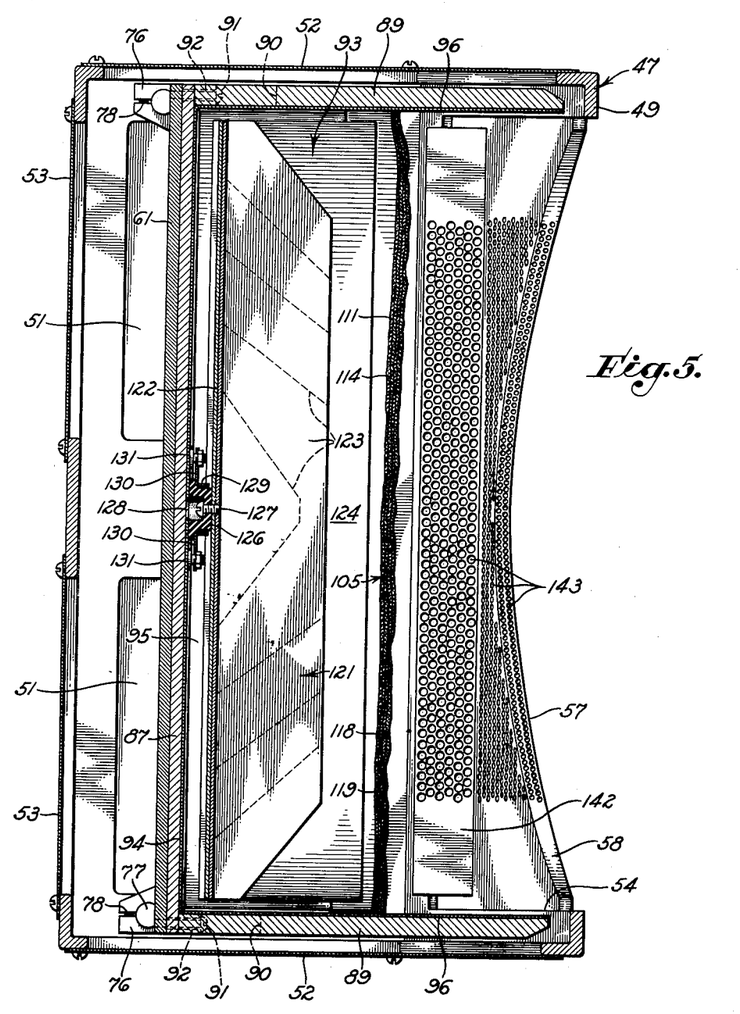
Fig. 5 is a horizontal sectional view of the receiver shown in Fig. 2, taken as indicated by the line 5—5 in Fig. 3 with certain parts broken away for clarity.
Figure 6:
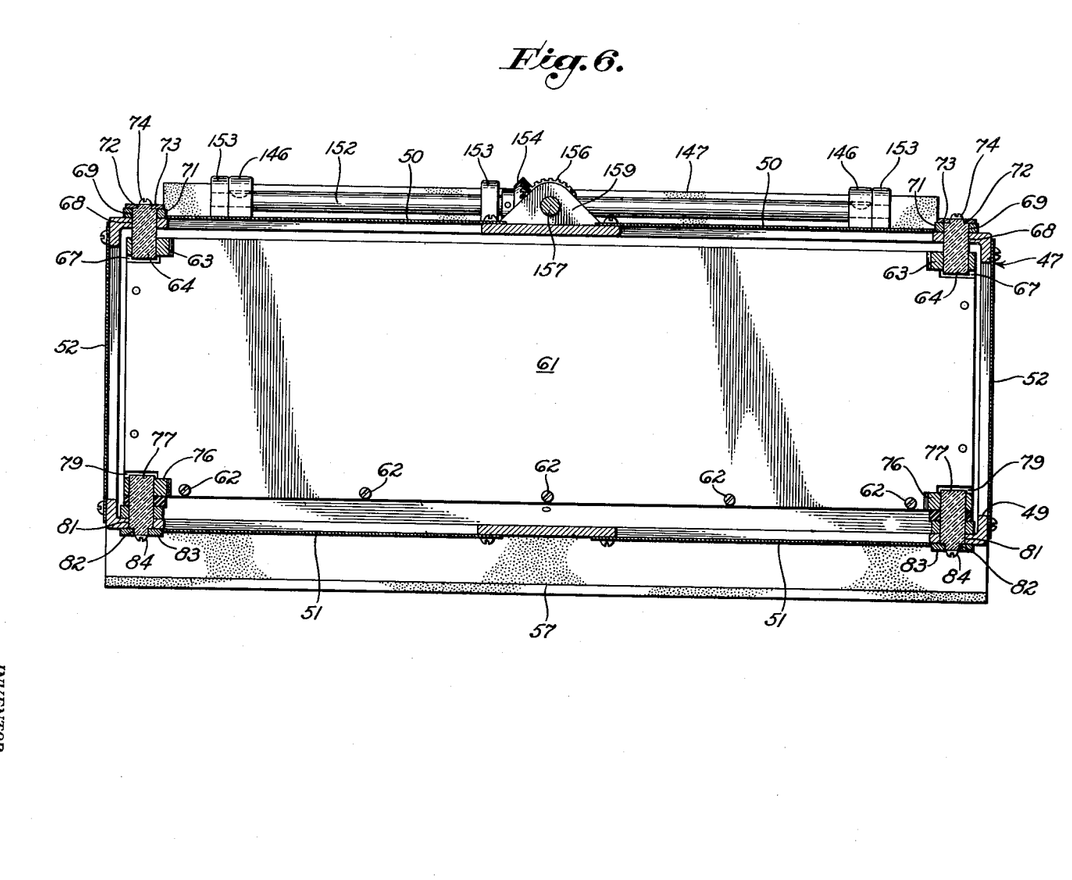
Fig. 6 is a vertical sectional view of the receiver shown in Fig. 2, taken as indicated by the line 6—6 in Fig. 3.

As best shown in Figs. 3 and 4, the several laminae of which the common wall 105 is formed are held in place between the flanged lower edges of the end walls 96 of the pocket 93, which end walls extend slightly beyond the bottom wall 95 of this pocket; and a plurality of appropriately positioned wedge-shaped braces 108 are wedged between the laminated carbon wall 105 and the horizontal plate 86 to assist in causing the several carbon laminae to conform to the contour of the wedge-shaped plate 98. The wedge-shaped braces 108 may be formed of sheet metal, preferably having forward ends 109 tapered nearly to a knife edge, and may be anchored in place by respective angle strips 110 secured to the wedge-shaped braces and to the horizontal plate 86 in any suitable manner.

When installing the several carbon sheets in the preassembled unit of which they form a part, a first thin carbon sheet 111 may readily be sprung by hand to approximately the desired curvature and slipped into place. This carbon sheet may be held in place by a first metal strip 112 that extends substantially the full length of the carbon sheet and is clamped against it by a plurality of screws 113 (only one being shown) that pass through the first metal strip and through the first carbon sheet and are threaded into the wedge-shaped plate 98. A second thin carbon sheet 114, narrower than the first, may then be similarly manipulated and positioned against the first carbon sheet forwardly of the first metal strip 112 and may be similarly held in place by a second metal strip 116 that is clamped against the second carbon sheet by a plurality of screws 117 (only one being shown) that pass through the second metal strip and through the first and second carbon sheets and are threaded into the wedge-shaped plate 98. A third thin carbon sheet 118, narrower than the second, may then be similarly manipulated and positioned against the second carbon sheet, forwardly of the second metal strip 116, the third carbon sheet being temporarily held in place by the flanged lower ends of the end walls 96 of the pocket 93. Finally, a fourth thin carbon sheet 119, wider than any of the others, is similarly manipulated and positioned as shown in the drawings, this fourth carbon sheet also being temporarily held in place by the flanged lower edges of the end walls 96 of the pocket 93. The fourth carbon sheet has its rearward edge in contact with the carbon strip 104 between the baffle 103 and the horizontal plate 86. After the four carbon sheets 111, 114, 118, and 119 have been positioned as shown in the drawings, the two wedge-shaped braces 108 are positioned so as to hold the assembly together and are secured to the horizontal plate 86 by suitable fastening elements (not shown).

Inside the ion receiving pocket 93, an ion trapping structure 121 is positioned for intercepting and trapping substantially all of the ions entering this pocket through the opening 107. This ion trapping structure substantially completely covers the back wall of the pocket for shielding it from direct bombardment and is mounted on the back wall and is insulated therefrom in a manner described hereinafter.

As shown in Figs. 3 to 5, the ion trapping structure 121 comprises a back plate 122 and a plurality of similar fins or blades 123 that are soldered or otherwise firmly secured to the back plate 122 and that project forwardly therefrom in the general direction of the opening 107 of the pocket 93. The rearward edges of the several blades 123 are suitably secured to the back plate 122 in spaced-apart relation, and the blades are so oriented that the several planes respectively defined thereby converge in the general direction of the opening 107.

In a copending application of John G. Backus, Serial No. 596,225, filed May 28, 1945, an ion receiving pocket containing an ion trapping structure was disclosed, the ion trapping structure comprising a plurality of substantially parallel, ion trapping blades disposed at such an angle with respect to a median path of the beam (paths of ions leaving the source unit with zero degrees divergence) that one surface only of each of the blades was exposed to direct ion bombardment. In the device disclosed in that application, however, the spaces between adjacent pairs of ion trapping blades formed a series of adjacent pockets that collectively received all of the isotope components of the beam, no separation of the components being made at the opening in the beam viewing face of the receiver. In the present case, quite different conditions are encountered.

As noted in the introductory portion of the instant specification, the ion beam first diverges from the ion source unit and then converges toward and diverges again beyond the 180° region of focus. The amount of convergence and subsequent divergence of the beam as a whole adjacent the 180° region of focus is the same as the initial angle of divergence of the beam from the source unit; and this is likewise true for each different isotope component of the beam. Thus, beyond the 180° foci of the several beam components, the ion paths of each component diverge at various angles between the maximum determined at the source unit.

When employing a series of ion trapping blades to assist in retaining ions in a receiver pocket, it is desired that as many ions as possible be intercepted by a surface of one of the blades with a small acute angle of incidence before reaching the back wall of the receiver pocket, with the points of interception located far enough back from the forward edges of the blades so that particles scattering or sputtering from the directly bombarded surfaces of the blades will deposit on the opposite surfaces of adjacent blades where there is no direct ion bombardment. To accomplish this most effectively, each blade should be inclined at as acute an angle as possible to the median path of those ions striking it without exposing the back wall of the pocket to direct ion bombardment and while exposing only one surface of the blade to direct ion bombardment. Thus, there are several factors that must be taken into consideration if the inclinations of the blades are all to be set for maximum ion trapping efficiency. These factors include: the distance the blades are spaced apart, the depth of the blades, the width of the beam delimiting slot through which ions enter the receiver, the maximum angle of divergence of ions after they enter the receiver, and the percentage distribution of the angles of travel of ions striking a given blade over the range of angles within which those ions are travelling. After taking all of these factors into account, it is possible to select an optimum angle of orientation for each blade for accomplishing the ion trapping function most effectively. In practice, however, sufficient accuracy in orienting the blades may be achieved by determining the optimum extreme angles for the two directly bombarded blades adjacent opposite ends of the series of blades, dividing the difference in the angular positions (with respect to a selected reference plane) by the number of intermediate blades in the series, and varying the angular positions of the intermediate blades more or less uniformly in order from one extreme to the other. By following this procedure, the two directly bombarded blades adjacent opposite ends of the series of blades will be so disposed that the planes defined thereby converge toward a line of intersection some distance beyond the viewing face of the receiver, and the intermediate blades will be oriented in order at progressively increasing or decreasing angles from one extreme to the other. The result will be that the series of directly bombarded blades will all converge in the general direction of the anterior pocket opening through which the ions enter the pocket.

Material deposited on the ion trapping structure 121 is most conveniently recovered at the conclusion of a collection run by a suitable chemical process including, as a first step, immersing the ion trapping structure in an acid bath for dissolving the deposited material, together with a substantial portion of the metal (preferably stainless steel) of which the ion trapping structure is fabricated. (See the copending application of Martin D. Kamen, Serial No. 532,160, filed April 21, 1944.)

For economy in recovering from the ion trapping blades the material deposited thereon as well as for simplicity and economy of construction, it is obviously desirable to use as few blades as possible. From geometrical considerations involving selected individual ion trajectories and the relation of these trajectories to the particular blade arrangement employed, it was found that the blades farthest from the common wall 105 would not have to be spaced as closely together as the blades located closer to that common wall. Thus, the spacing of the blades was more or less uniformly varied, as shown in Fig. 3, from a close spacing adjacent the common wall 105 to a substantially wider spacing at the opposite end of the series of blades.

Because of the curvature of the beam delimiting slot 58 and of the wall 105, some of the blades 123 closest to the wall 105 are necessarily shorter in length than the others, the shortest blade being the closest to the wall 105. This is clearly shown in Figs. 4 and 5.

A shielding blade 124 is included in the ion trapping structure at one end of the series of blades 123. This shielding blade is slightly spaced from the common wall 105 and is extended farther forward toward the face plate structure of the receiver than the blades 123 for catching de-ionized material trapped by the ion trapping structure and falling therefrom that might otherwise accumulate on the wall 105. The particles of this material tend to adhere together forming sizeable flakes that are capable of shorting the ion trapping structure to the wall 105 if they are permitted to fall onto the latter in any substantial quantity.

The ion trapping structure 121 is mounted on the back wall of the pocket 93 by means of three hollow insulators 126 that are secured to the back plate 122 of the ion trapping structure by respective screws 127, openings 128 being provided in the back wall of the pocket to afford access to these screws. The insulators are circular in cross section and are provided with shoulders against which respective clamping rings 129 may bear for securing the insulators to the back wall of the pocket 93. Each clamping ring 129 is formed with a pair of oppositely extending ears 130 through which respectively associated screws 131 may be passed for securing the clamping ring directly to the back wall of the pocket, the screws preferably having their head ends soldered or otherwise permanently secured to the back wall of the pocket. With this arrangement, it is a simple matter to mount the ion trapping structure in the pocket 93 prior to associating the pocket structure with the frame plates 86, 87 and 89.

When an ion beam is focused upon the face plate structure of this receiver, a substantial amount of material is scattered or sputtered from the edges of the beam delimiting slot 58 and from the forward edge of the common wall 105, and a considerable amount of this material tends to be deposited on the forward surface of the forward wall of the pocket 93. It is desired to avoid contaminating the material deposited within the pocket with the material so deposited on the forward wall of the pocket during the process of recovering material at the end of a collection run. To minimize the likelihood of such contamination occurring, the forward surface of the forward wall of the pocket 93 is covered with a shielding plate 133 that is shaped to conform to the forward wall of the pocket and to extend a short distance back along the top wall of the pocket where it terminates in a flange 134. An angle bracket 136 is soldered or otherwise permanently secured to the top wall of the pocket, and a plurality of screws 137 (only one being shown) are passed through the flange 134 and through the angle bracket for anchoring one edge of the plate 133 in position. Additional fastening elements for securing the plate 133 in position may include a plurality of screws 138 that may be passed through the plate 133 and through the forward wall of the pocket and be threaded into appropriate backing plates 139 disposed against the forward wall of the pocket on the opposite side thereof.

The ions admitted into the pocket 106 through the aligned portion of the beam delimiting slot 58 are substantially all intercepted by the sloping common wall 105, and a great deal of the material intercepted by this wall is scattered or sputtered therefrom. In the absence of an appropriate barrier, a substantial portion of this material would pass out of the pocket 106 through a gap 141 between the face plate 57 and the forward edges of the plates 59 and 86. To prevent such escape of collected material from the pocket 106, the face plate 57 is provided with a thick, integrally formed, rearwardly extending barrier 142 that projects sufficiently far into the pocket 106 to close the gap 141. Since the entire ion receiving structure housed within the receiver frame 47 is electrically insulated from the frame, it is necessary that this barrier 142 be spaced slightly from the adjacent edge of the plate 86 in order to avoid an electrical short between it and the receiver face plate structure.

When the receiver is employed to receive a uranium ion beam for the purpose of collecting material enriched with respect to the $U^{235}$ isotope in the pocket 93 and material enriched with respect to the $U^{238}$ isotope in the pocket 106, the most intense portion of the entire beam cross-section is focused on the portion of the slot 58 leading into the pocket 106, and a relatively high concentration of neutralized particles are scattered or sputtered from the wall 105 toward the barrier 142. Under normal conditions, material scattering or sputtering from a directly bombarded surface onto another surface not subjected to direct bombardment tends to accumulate on the latter surface and to form thick leaves or flakes of considerable size. Possibly because of heating due to the bombardment, these leaves or flakes are inclined to warp so as to project substantial distances out from the surfaces on which they are formed. It was found that a barrier wall such as 142 having a plane surface exposed to secondary bombardment by material scattered or sputtered from another surface closely adjacent thereto, accumulated this material to such an extent that the leaves or flakes formed thereby frequently extended completely across the gap between the two surfaces and caused electrical shorts therebetween. To overcome this difficulty and avoid electrical shorts between the ion receiving structure and the face plate 57, the surface of the barrier 142 subjected to such secondary bombardment was provided with a large number of closely spaced, relatively deep pits 143. The formation of such pits in this surface provides a greatly increased area subjected to secondary bombardment, and the material deposited thereon has less of a tendency to peel off or crack loose. When the deposited material does peel off from such an intaglio surface, it is mostly in the form of short flakes, rather than long slivers such as form on a plane surface, and it has a much lessened tendency to build up across the gap between the wall 105 and the barrier 142.

In the device disclosed herein for illustrative purposes, these pits 143 were formed by drilling holes into the surface subjected to secondary bombardment, but it is to be understood that the particular type of intaglio surface resulting from such an operation is in no way critical, and that equally successful results have been obtained by cutting the surface in other ways to form different intaglio patterns, such, for example, as by milling a large number of parallel slots into the surface in each of two directions normal to each other to form a checkerboard pattern thereon.

The door 48, referred to above, is provided for closing the entrance to the pocket 93 without closing the entrance to the pocket 106 while the beam is being focused prior to attaining conditions suitable for collection of material in the pocket 93. This door may comprise a backing plate 144 having two ears 146 integrally formed thereon at opposite ends thereof. A carbon plate 147, having a thickened tapered edge portion 148, may be suitably secured to the backing plate 144 for protecting the latter from ion bombardment, and a baffle 149, partially supported by a block 151, may be secured to the backing plate 144 by suitable fastening elements for intercepting side band material from a beam focused on an adjacent receiver in the manner disclosed in greater detail in my above-mentioned copending application, Serial No. 687,632. A shaft 152 is mounted at its opposite ends in the two ears 146 and is keyed thereto so that appropriate rotation of the shaft will swing the door about the axis of the shaft between open and closed positions. The shaft 152 is rotatably mounted adjacent the forward end of the receiver frame 47 in three ears 153 formed integrally with the receiver frame, and a beveled pinion 154 is mounted on and keyed to this shaft adjacent the center thereof. A beveled gear 156 is mounted on the forward end of a horizontally disposed, rotatable shaft 157, the beveled gear being in mesh with the beveled pinion 154 whereby rotary movement of the shaft 157 will be transmitted to the shaft 152 and cause the door to swing about its axis of rotation.

As disclosed in my above-mentioned copending application, Serial No. 687,632, the shaft 157 may be employed for the dual purpose of moving the receiver along a straight-line path parallel to this shaft and for opening and closing the door 48. Thus, to assist in preventing axial movement of the shaft 157 with respect to the receiver frame 47, the forward end of the shaft is formed with a portion 158 of reduced diameter that projects through another ear 159 integrally formed on the receiver frame, and the beveled gear 156 is keyed on this portion 158 beyond the ear 159, whereby axial movement of the shaft 157 in either direction with respect to the receiver frame is prevented. Alignment of the shaft 157 with respect to the receiver frame is maintained by means of another ear 161 integrally formed on the receiver frame adjacent the rearward end thereof, and a suitable mechanism carried by this ear 161 cooperates with a collar 162 on the shaft 157 to provide additional restraint against axial movement of the shaft and to limit the rotation thereof between angular positions corresponding to the open and closed door positions. This mechanism mounted on the ear 161 includes an apertured cap 163 that fits around the shaft 157 and around the collar 162 thereon, the cap 163 being secured to the ear 161 by suitable fastening elements (not shown) and being provided with a pin 164 rigidly mounted therein on the rearward surface thereof. An additional collar 166 is secured on the shaft 157 adjacent the cap 163 by means of a pin 167, and the collar 166 is provided with an integral, semi-annular flange 168, the opposite ends of which are respectively adapted to contact the pin 164 when the shaft 157 reaches the limits of its rotary movement. The beveled gear 156 and the beveled pinion 154 are designed to maintain a ratio between the angular rotation of the shafts 157 and 152 such that rotation of the former through an angle determined by the flange 168 will swing the door 48 through a desired angle between its open and closed positions (Figs. 2 and 3).

From the receiver frame 47, the shaft 157 may extend further rearwardly out of the calutron tank and may be associated with suitable apparatus permitting rotation of the shaft for operating the receiver door and for effecting axial movement of the shaft for positioning the receiver with respect to the beam to be received thereby. Such structure forms no part of the present invention and is illustrated in detail in my above-mentioned copending application, Serial No. 687,632, which application also discloses, in somewhat greater detail, the above described mechanism for limiting rotation of the shaft 157.

During operation of a calutron embodying a receiver of the type disclosed herein, it is desirable to be able to determine at any time the rate at which ions are being intercepted by the ion trapping structure 121 and the rate at which ions are entering the pocket 106. In addition, when the door 48 is in its closed position (Fig. 3) it is desirable to be able to determine the rate at which ions are entering the pocket 106. For this purpose a pair of suitable electrical leads 170 and 171 may be passed into the calutron tank, into the liner 30 through the insulating conduit 37, and into the receiver frame 47 in any suitable manner, one of these leads being connected to the ion trapping structure 121 and the other being connected to any part of the ion receiving structure that is insulated from the ion trapping structure and from the receiver frame. At their ends, outside the calutron tank, these leads be passed to ground through respective meters (not shown) for reading the currents required to neutralize ions striking the portions of the receiver to which the opposite ends of these leads are respectively connected. The meter readings will then provide continuous indications of the two ion reception rates mentioned above.

For simplicity, no apparatus has been shown for cooling various parts of the receiver that are subjected to intense heating as a result of ion bombardment. It will be understood, however, that any suitable arrangement of water cooling conduits or the like may be employed for this purpose.

At the conclusion of a collection run, the receiver is removed from the calutron tank for recovering the material deposited in the pockets 93 and 106 thereof. Access to the interior of the receiver for this purpose is obtained by removing the face plates 56 and 57 and the several removable cover plates 52 and 53, thereby permitting the entire ion receiving structure to be detached from the horizontal and vertical plates 59 and 61 that form a supporting platform therefor, and permitting removal of the ion receiving structure from the receiver frame through the opening 54 in the forward wall thereof. The ion receiving structure may then be disassembled by detaching the structure defining the pocket 93 merely by removing the several screws 91 and 97; and the ion trapping structure 121 may then be detached by removal of the screws 127. Material deposited upon the ion trapping structure 121 may then be separately recovered in any desired manner from the remainder of the material deposited within the pocket 93, which latter material may differ substantially in its isotope composition from that retained by the ion trapping structure. The structure defining the pocket 106 may then be disassembled by first removing the screws 88, thereby permitting separation of the horizontal plate 86 from the vertical plate 87 and permitting separate recovery of material deposited on these two parts of this assembly. During this operation the small baffle 103 assists in retaining with the horizontal plate 86 and with the parts directly attached thereto, all loose material deposited in the pocket 106. The laminated carbon wall 105 may then be disassembled in an obvious manner, and material adhering to the first carbon sheet 111 thereof may be combined with material recovered from the structure defining the pocket 93, while material adhering to the fourth carbon sheet 119 may be combined with the other material deposited in the pocket 106. In addition, material adhering to the barrier wall 142 of the face plate 57 may be combined with the other material deposited within the pocket 106.

From the foregoing description, it will be apparent that I have provided a calutron receiver ideally suited for collecting from a uranium ion beam separated quantities of material enriched with respect to different isotopes and having the various advantages recited in the objects of the invention recited above. While a specific embodiment of the invention has been described in detail, it is to be understood that this has been done for illustrative purposes and that the invention is not limited thereby except as may be required by the appended claims.

What is claimed is:

1. A calutron receiver comprising a frame, a beam viewing face mounted on said frame and having a longitudinally curved slot therethrough, structure defining a plurality of ion collecting pockets mounted on said frame behind said viewing face and having respective ion receiving openings therein disposed behind said slot, said pockets having a common wall that projects forwardly from between said ion receiving openings into said slot and that divides the slot longitudinally into two narrower beam separating slots respectively aligned with said ion receiving openings.

2. A calutron receiver comprising a frame, a beam viewing face mounted on said frame and having a longitudinally curved slot therethrough, structure defining a plurality of ion collecting pockets mounted on said frame behind said viewing face and having respective ion receiving openings therein disposed behind said slot, said pockets having a common wall that projects forwardly from between said ion receiving openings into said slot and that divides the slot longitudinally into two narrower beam separating slots respectively aligned with said ion receiving openings, said common wall comprising a carbon sheet flexed to follow the curvature of said slots.

3. A calutron receiver comprising a frame, a beam viewing face mounted on said frame and having a longitudinally curved slot therethrough, structure defining a plurality of ion collecting pockets mounted on said frame behind said viewing face and having respective ion receiving openings therein disposed behind said slot, said pockets having a common wall that projects forwardly from between said ion receiving openings into said slot and that divides the slot longitudinally into two narrower beam separating slots respectively aligned with said ion receiving openings, said common wall comprising a plurality of carbon laminae flexed to follow the curvature of said slots.

4. A receiver for a calutron ion beam, comprising walls defining an ion receiving pocket having an opening at one end thereof and a series of spaced-apart ion trapping blades disposed within said pocket opposite said opening, said blades being convergent in the general direction of said opening.

5. A receiver for a calutron ion beam, comprising walls defining an ion receiving pocket having an opening at one end thereof and a series of spaced-apart elongated ion trapping blades disposed within said pocket opposite said opening, said blades being laterally convergent in the direction of said opening.

6. A receiver for a calutron ion beam, comprising walls defining an ion receiving pocket having an elongated opening at one end thereof and a series of spaced-apart elongated ion trapping blades disposed within said pocket opposite said opening with their longitudinal dimensions generally parallel to the longitudinal dimension of said opening and being laterally convergent in the general direction of said opening.

7. A receiver for a calutron ion beam, comprising walls defining an ion receiving pocket having an opening at one end thereof and a series of spaced-apart ion trapping blades disposed within said pocket and converging in the general direction of said opening from the opposite end of the pocket.

8. A receiver for a calutron ion beam, comprising walls defining an ion receiving pocket having an elongated opening at one end thereof and a series of spaced-apart elongated ion trapping blades mounted within said pocket on a wall thereof opposite said opening and converging in the general direction of said opening.

9. A receiver for a calutron ion beam, comprising walls defining an ion receiving pocket having an opening at one end thereof and a series of spaced-apart ion trapping blades disposed within said pocket opposite said opening, blades being convergent in the general direction of said opening but being oriented so that one surface only of each blade is exposed to direct bombardment by ions traveling through said opening toward the blades.

10. A calutron receiver comprising a frame, a beam viewing face mounted on one side of said frame and having a slot therethrough, wall members mounted on the remaining sides of said frame to form a chamber, a plate member disposed within said chamber with an edge thereof lying within said slot and parallel to the sides thereof for dividing said chamber into two separate ion receiving areas, and an ion collecting pocket disposed within one of said areas and insulated therefrom.

11. A calutron receiver comprising a frame, a beam viewing face mounted on one side of said frame and having a slot therethrough, wall members mounted on the remaining sides of said frame to form a chamber, a plate member disposed within said chamber with an edge thereof lying within said slot and parallel to the sides thereof for dividing said chamber into two separate ion receiving areas, and an ion collecting pocket disposed within one of said areas, the surface of the wall of the other of said areas being intaglioed to limit the build-up of neutralized beam particles scattered from said plate member.

No references cited.